United States Patent [19]

Grolman et al.

[11] 4,121,346
[45] Oct. 24, 1978

[54] OPTICAL CENTER LOCATOR FOR SPECTACLES

[75] Inventors: Bernard Grolman, Worcester; William Richards, Medway, both of Mass.

[73] Assignee: American Optical Corporation, Southbridge, Mass.

[21] Appl. No.: 807,469

[22] Filed: Jun. 17, 1977

[51] Int. Cl.² ............................................. A61B 3/10
[52] U.S. Cl. .................................. 33/200; 33/174 A; 403/162
[58] Field of Search .............. 33/174 A, 200; 403/162

[56] References Cited

U.S. PATENT DOCUMENTS

| | | | |
|---|---|---|---|
| 534,793 | 2/1895 | Helvey | 403/162 |
| 1,263,713 | 4/1918 | Smith | 33/200 X |
| 2,022,202 | 11/1935 | Hersch | 33/200 |
| 2,325,569 | 7/1943 | Hancock et al. | 33/200 X |
| 2,677,894 | 5/1954 | Belgard | 33/200 |
| 2,884,832 | 5/1959 | Engelman | 33/200 X |

FOREIGN PATENT DOCUMENTS

| | | | |
|---|---|---|---|
| 66,520 | 3/1957 | France | 33/200 |
| 201,678 | 12/1938 | Switzerland | 33/200 |

Primary Examiner—Charles E. Phillips
Attorney, Agent, or Firm—Jeremiah J. Duggan

[57] ABSTRACT

A device for use in fitting ophthalmic lenses to spectacles frames. Horizontal and vertical measurements from optical centers of the lenses to their extreme lateral nasal and inferior edges are obtained by attaching the device to the edge of rimless lenses of a properly patient fitted sample rimless spectacles or rims of a similarly fitted rimmed spectacles frame intended to receive the lenses. The sample rimless spectacles or rimmed frame is then placed in the normal position of use upon the patient and a wand component of the fitting device is used to indicate the proper lens optical center location relative to the patient's pupils. Extreme lateral and inferior lens edge measurements are taken from the wand and forwarded to the lens finishing shop for edging of the lenses to final size and shape.

9 Claims, 5 Drawing Figures

OPTICAL CENTER LOCATOR FOR SPECTACLES

BACKGROUND OF THE INVENTION

1. Field of the Invention

This invention relates to improvements in means for fitting ophthalmic lenses in spectacles frames and has particular reference to a device for locating the optimum position for lens optical centers relative to extreme lateral and inferior edges of the lenses as determined by locations of patient's pupils relative to properly fitted spectacles frames intended to receive the lenses.

2. Description of the Prior Art

The fitting of lenses to various shapes and sizes of frames especially of the rimless type is ordinarily a tedious, time consuming and relatively difficult undertaking requiring special skills. The great number of aids offered in the prior art for allegedly facilitating ophthalmic glazing are evidence of the generally recognized problems involved in obtaining optimum ophthalmic glazing. These glazing aids include for example lens blank and frame coordinating charts of which the disclosure of U.S. Pat. No. 3,740,857 is exemplary; ordinary millimeter scales and/or scales having special nose rests, pointers and auxiliary measuring devices applied thereto as for example in U.S. Pat. No. 1,912,107; and special fitting frames of which those represented in U.S. Pat. Nos. 1,505,447 and 638,727 are exemplary.

While these prior art devices may relieve some of the problems and tediousness in measuring for optical center location and lens fitting in general, the accuracy of fitting therewith continues to rely heavily upon the skill and painstakingness of the practitioner together with similar carefulness in proper interpretation and use of the measuring information in the lens finishing shop since this information is not taken from or applied directly to the ultimate spectacles frame i.e. that selected by the patient.

Prior art approaches to applying measurements directly to patient selected and prefitted frames, have required exceptionally ungainly and overly complicated apparatuses supplying only the heretofore conventional measurements of pupillary distance (PD) from the center of the frame and vertical height of bifocal segment, for example, in each case. Some of the Prior Art additionally require the learning and practice of relatively complicated operating procedures involving in each case an unduly number of sequentially performed steps including, to name a few, those of measuring one lens fitting parameter such as PD, the necessity to thereafter neutralize the instrument components, and subsequently separately individually measuring another parameter such as optical center or reading segment height.

An improvement over the prior art of U.S. Pat. No. 2,491,312 is disclosed in U.S. application Ser. No. 619,083 filed Oct. 2, 1975, now U.S. Pat. No. 4,055,900 in the name of the present inventors. Therein the earlier instrument costliness, ungainliness and tediousness of operation have been largely obviated. This latter invention, however, falls somewhat short of affording maximum simplicity in optical center locating apparatus especially in situations involving optical center location for rimless ophthalmic spectacles frames.

Accordingly, it is an object of the present invention to accomplish greater simplicity and economy of construction with unusual ease and straightforwardness of operation in lens optical center locating procedures and apparatuses; and Another object is to render the scheme and instrumentation of the invention adaptable to use with patient prefitted rimless or rimmed spectacles and straightforwardly adaptable to the traditional boxing method of lens layout for ophthalmic glazing; those interested in details of this method may refer to "The Boxing Method of Specifying Eye Size" by Glenn A. Fry, Ph.D. Journal of the American Optometric Association, February, 1959, pages 481–484.

Other objects and advantages of the invention will become more readily apparent from the description which follows;

SUMMARY OF THE INVENTION

The foregoing objects and their corollaries are accomplished by the provision of a uniquely simple and inexpensive optical center locator comprising a main supporting body preferably in the form of a bulldog clip upon which is swivel mounted an optical center locating wand. The wand, having a distal target, is longitudinally and rotationally adjustable in its mounting for movement of the target respectively toward and away from the clip as well as rotationally in a plane parallel to the bite of the clip. The swivel mounting is constructed and arranged to afford a frictional drag against the wand at all times to prevent its being accidentally displaced from a preselected position of rotational and/or longitudinal adjustment.

Horizontal and vertical measurements from optical centers of lenses to be mounted in spectacles frames, i.e., from their extreme lateral nasal and inferior edges, are obtained by attaching the optical center locator to the edge of rimless lenses of a properly patient fitted sample rimless spectacles or to rims of a similarly fitted rimmed spectacles frame intended to receive the lenses. This attachment is accomplished with the main bulldog body of the clip in each case wherein its bite is disposed in the plane of the lens.

The sample rimless spectacles or the rimmed frame, as the case may be, is placed in the normal position of use upon the patient and the wand of each optical center locator is adjusted to position its distal target at the proper lens optical center location relative to a particular patient's pupil. This, for most patients, will be immediately in line with the pupil center but may, if necessary, be slightly below or above or to one side of the precise center of the pupil.

With the optical center locations so established relative to the spectacles frame, extreme lateral and inferior lens edge measurements are taken from each target and forwarded to the lens finishing shop for edging of the lenses to final size and shape.

Details of the invention will become more readily apparent from the following description when taken in conjunction with the accompanying drawings.

IN THE DRAWINGS

DESCRIPTION OF THE PREFERRED EMBODIMENTS

Figure 1:
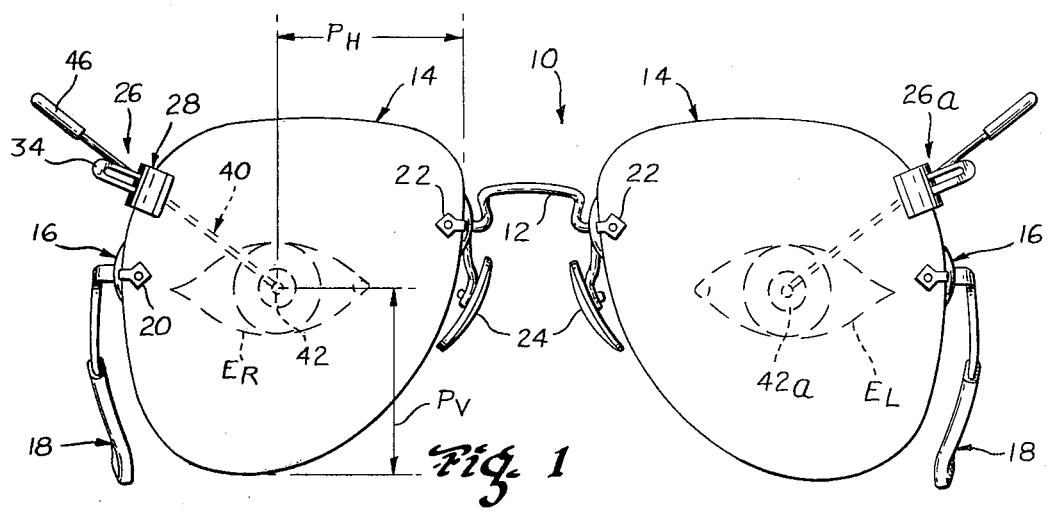
FIG. 1 is a front elevational view of a pair of spectacles incorporating embodiments of the invention.
Figure 2:
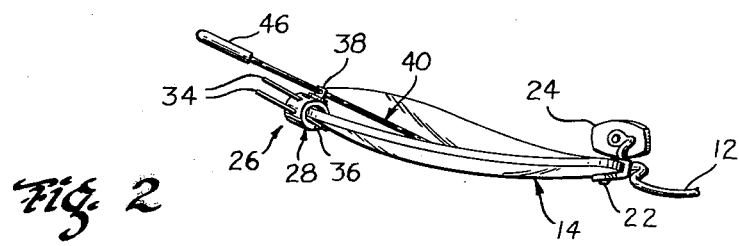
FIG. 2 is a fragmentary top plan view of a portion of the pair of spectacles illustrated in FIG. 1.

Referring more particularly to the drawings, there is illustrated in FIGS. 1 and 2 a rimless spectacles 10 comprised of bridge 12, lenses 14, endpieces 16 and temples 18. Lens straps 20 and 22 extending from endpieces 16 and bridge 12 support lenses 14 while nose pads 24 and temples 18 are used to fix the spectacles 10 before right and left eyes $E_R$ and $E_L$ of a patient.

Attached to right and left eye lenses 14 in a position of use therewith are optical center locators 26 and 26a respectively, only one of which (locator 26) will be described in detail hereinafter, it being understood that the two are identical in construction and function and may be used interchangeably for right and left eye lenses of spectacles frames.

Figure 3:
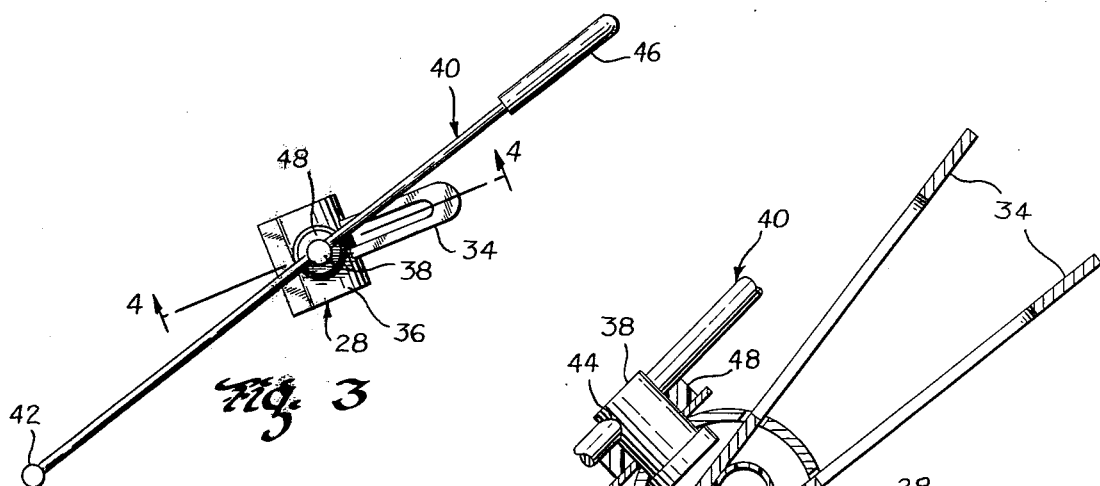
FIG. 3 is a rear elevational view of a preferred optical center locator construction.
Figure 4:
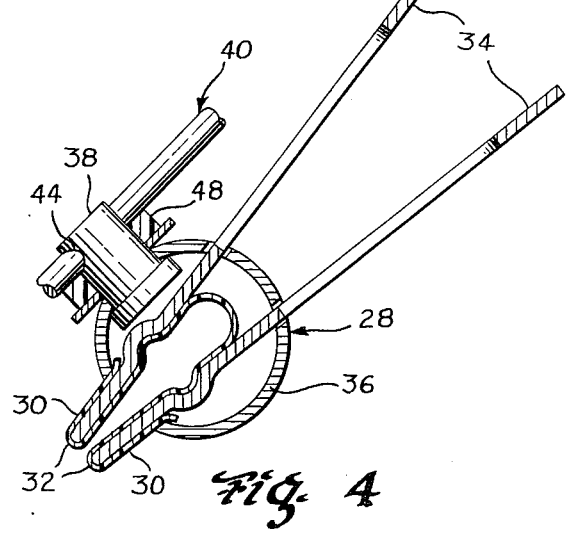
FIG. 4 is an enlarged cross sectional view taken generally along line 4—4 of FIG. 3.

Referring more particularly to optical center (OC) locator 26 which is depicted as being attached to the right eye lens of spectacles 10 (FIG. 1) and further illustrated in FIGS. 2, 3 and 4, the structure includes main body 28 in the form of a bulldog clip having its jaws 30 faced with a layer 32 of plastic material such as nylon or an equivalent durable but resilient material. The facing is provided to avoid marring of lenses to which the OC locator is clamped. in conventional bulldog clip fashion, handles 34 extend through spring-tempered C-clamp 34 and terminally form jaws 30 normally closed by clamp 34 but adapted to be opened by squeezing handles 34 together with the fingers.

Wand 40 is attached to one side of spring clamp 36 with pivot post 38 and carries distal target 42 preferably in the form of a brightly colored plastic or painted disc or ball. The wand extends, with sliding fit, through opening 44 in post 38 and, for convenience of its manipulation, is provided with a proximal handle 46. A resilient plastic or rubber washer 48 held slightly in compression between wand 40 and C-clamp 36 retains wand 40 substantially fixedly in desired positions of longitudinal and/or rotational adjustment relative to pivot post 38 while permitting easily manually induced sliding and/or swinging adjustment of wand 40 without causing unwanted displacement of main body 28.

A preferred procedure for use of the OC locator 26 is as follows:

a sample spectacles frame 10 having lenses 14 of desired style (i.e. peripheral configuration) and proper bridge size (i.e. span between lenses 14) is selected and fitted to the face of the patient before his right and left eyes $E_R$ and $E_L$ (FIG. 1).

With the patient advised to assume a comfortable posture looking straight ahead and the fitting practitioner facing the patient squarely with his eyes level with the patient's eyes, the practitioner closes his right eye and directs the patient to fixate upon his left eye. This having been done, wand 40 of OC locator 26 is adjusted in pivot post 38 to the point where its target 42 is brought into desired position relative to the patient's pupil or right eye $E_R$. For most patients, target 42 will be centered with the patient's pupil. In special cases, however, it may be desirable to position target 42 slightly above or to one side of the pupil center.

The operation of setting wand 40 of locator 26 is repeated for the left eye $E_L$ by means of a second identical OC locator 26a (FIG. 1). The procedure for locating target 42a of locator 26a should be performed with the practitioner's left eye closed and the patient directed to fixate upon the practitioner's open right eye.

Figure 5:
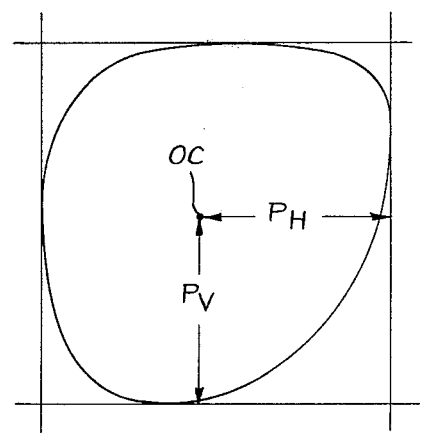
FIG. 5 is a schematic illustration of the applicability of ophthalmic measurements obtained according to the invention.

Having so located targets 42 and 42a of OC locators 26 and 26a a quick recheck of the right and left pupil positions is advised. Then, without further movement of the wands, the complete spectacles frame 10 with locators 26 and 26a is removed from the patient and lens optical center locations are determined as follows:

The horizonatal distance $P_H$ between target 42 and the extreme nasal edge of the lens is measured, e.g. with a millimeter scale and the vertical distance $P_V$ between target 42 and the extreme inferior edge of the lens is similarly measured. The measurements of these two distances $P_H$ and $P_V$ are supplied to the lens finishing laboratory together with the usual other Rx frame information such as lens style and size to be supplied. With these measurements and using the traditional boxing method illustrated in FIG. 5 the laboratory technician determines the precise location of optical center OC and edges the lenses accordingly. As pointed out hereinabove, details of the boxing method of specifying eye size may be found in the February, 1959, Journal of the American Optometric Association on pages 481-484.

Since in most lens shapes, their extreme lower points do not lie directly below the optical center, an assurance of accuracy of the $P_V$ measurement may be obtained by resting the open spectacles 10 on a flat surface and placing a millimeter scale with its zero index on the same flat surface next to the lens.

The procedure for determining the location of optical center of the left eye lens of spectacles 10 would be the same as just described.

In the event that the sample spectacles 10 from which optical center (OC) measurements have been determined has lenses 14 of larger or smaller size than is to be ultimately dispensed to the patient, compensation for the $P_H$ and $P_V$ measurements may be made as follows:

Assuming that the size of bridge 12 (i.e. the space between lenses 14) is appropriate, the $P_H$ dimensions taken from targets 42 and 42a will be correct for larger of smaller lens sizes. The $P_V$ dimension is, however, dependent upon the lens size and therefore requires modification if a different lens size is to be dispensed. Computation of the required $P_V$ measurement may be made by increasing or decreasing the $P_V$ measurement taken from frame 10 by one-half of the lens size change for each 1 millimeter increase or decrease of lens size. For example, if the lens size to be dispensed is 4 mm larger than the right eye lens 14 of spectacles 10, the $P_V$ dimension should be increased by 2 mm.

When using optical center locators 26 and 26a for determining $P_H$ and $P_V$ measurements for lenses to be mounted in a rimmed spectacles frame, the locators are merely clamped to the rims of the frame. The frame is then placed in properly fitted position before the eyes of a patient and targets 42 and 42a are brought into alignment with the patient's pupils. The $P_H$ and $P_V$ measurements are taken from each target to the extreme lateral and inferior inner edges of the respective rims and supplied to the lens finishing technician who, with consideration of the depth of lens receiving grooves in the rims, can then properly contour and optically center a pair of lenses for glazing the measured rimmed spectacles.

Those skilled in the art will readily appreciate that there are various modifications and adaptations of the precise form of the invention here shown which may suit particular requirements. Accordingly, the foregoing illustration is not to be interpreted as restrictive of the invention beyond that necessitated by the following claims.

We claim:

1. An optical center locator comprising,
a main supporting body;
a wand having a distal target;
means for swivel mounting said wand to said main supporting body including a pivot post through which said wand is extended and friction means between said wand and main body permitting manually induced swiveling and longitudinal sliding adjustments of said wand while normally holding said wand against accidental displacement from given positions of said adjustments.

2. An optical center locator according to claim 1 wherein said main supporting body is in the form of a clip for detachably connecting said optical center locator to an edge of a spectacles mounting.

3. An optical center locator according to claim 2 wherein said clip is a spring clip of the bulldog type.

4. An optical center locator according to claim 3 wherein said pivot post extends away from a side of said bulldog spring clip and said friction means comprises a resilient washer encircling said pivot post between said side of said clip and said wand.

5. An optical center locator according to claim 1 wherein said distal target comprises an enlargement of the distal end of said wand.

6. An optical center locator according to claim 1 wherein said distal target is in the form of a disc.

7. An optical center locator according to claim 1 wherein said distal target is in the form of a ball.

8. An optical center locator according to claim 1 wherein said friction means comprises a resilient washer encircling said pivot post.

9. An optical center locator according to claim 1 wherein said wand is proximally provided with a handle to facilitate is manual manipulation.

* * * * *